S. MILLER.
DITCHING MACHINE.
APPLICATION FILED APR. 24, 1909.
989,861.
Patented Apr. 18, 1911.
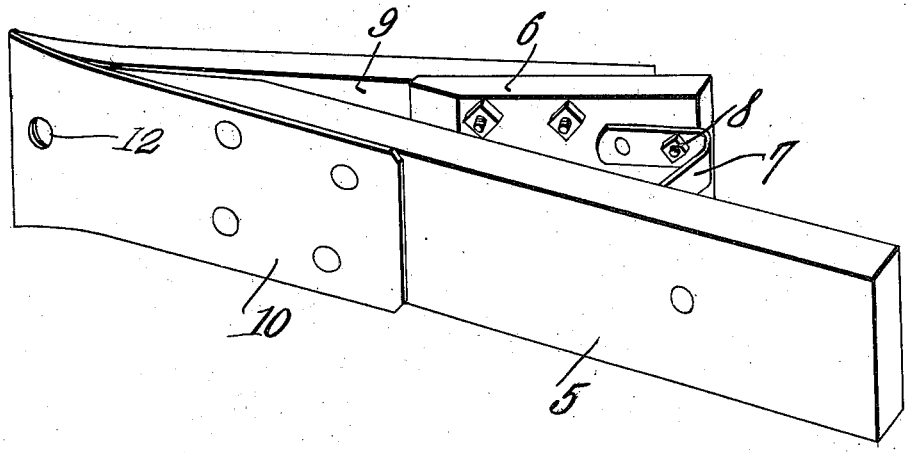
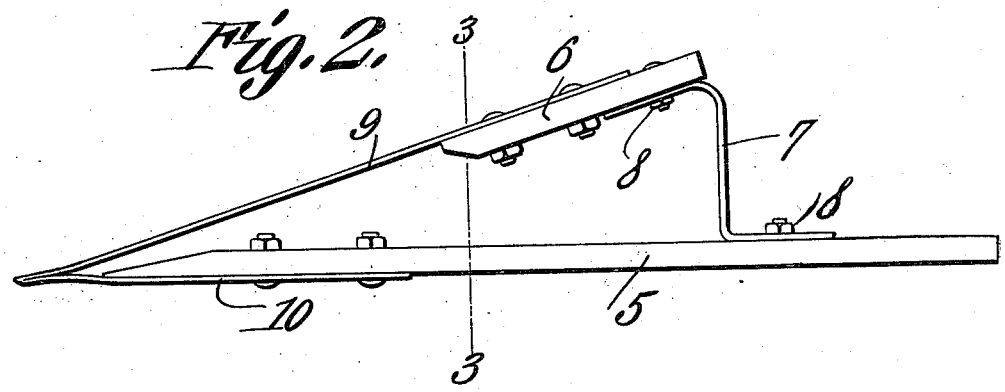
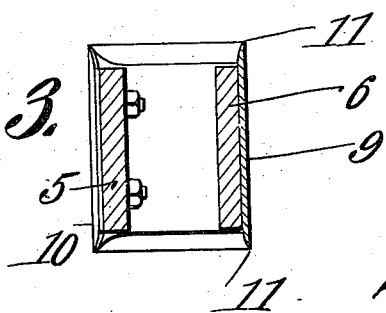

UNITED STATES PATENT OFFICE.

SAM MILLER, OF GEORGETOWN, TEXAS.

DITCHING-MACHINE.

989,861.

Specification of Letters Patent. Patented Apr. 18, 1911.

Application filed April 24, 1909. Serial No. 492,061.

*To all whom it may concern:*

Be it known that I, SAM MILLER, a citizen of the United States, residing at Georgetown, in the county of Williamson and State of Texas, have invented a new and useful Ditching-Machine, of which the following is a specification.

This invention has for its object to provide a ditching machine which is simple in construction and easy to operate.

Another object is to provide a reversible machine in order that it may be returned over the same line.

With the foregoing and other objects in view, the invention consists in the novel construction and arrangement of parts to be hereinafter described and claimed, reference being had to the drawing hereto annexed in which:—

Figure 1 is a perspective view of the machine. Fig. 2 is a plan view. Fig. 3 is a cross section on the line 3—3 of Fig. 2.

Referring more particularly to the drawings, 5 denotes the landside of the machine, said landside consisting of a wooden beam of suitable length. The brace is indicated at 6. This is set obliquely with respect to the landside, said parts converging in the direction of the front end of the machine.
The brace 6 is connected at its rear end to the landside by a transverse brace 7, said brace being secured at its ends to the brace 6, and the landside by bolts 8 or other suitable fastening means. The end portions of the brace 7 through which the bolts 8 pass are provided with a number of bolt-holes in order that adjustment may be made.

The brace 6 does not extend to the front end of the land side 5, the space therebetween being bridged by a scraper bar 9. This scraper bar is approximately V-shaped and is bolted or otherwise secured to the brace 6 and extends to the front end of the machine, from which it is carried rearwardly along the outer surface of the landside as indicated at 10 for a suitable distance and bolted or otherwise secured thereto. The two parts 9 and 10 of the scraper-blade come to a point at the front end of the machine.
The portion of the scraper blade which is connected with brace 6, has its upper and lower edges sharpened as indicated at 11, and said edges also extend respectively above and below the upper and lower edges of the brace 6 as shown in Fig. 3. The portion 10 of the blade at its rear end is of the same width as the landside 5 and at its forward end is widened out to the same width as the part 9 of the scraper bar as shown in Figs. 1 and 3.

The scraper blade has an opening 12 adjacent its point to receive the draft attachment.

It is to be understood that in operation, approximately half of the ditching device is in the ground, and the device is therefore reversible. In other words, the width of the scraper bar 9 is about twice the depth of the ditch, which is to be cut. The device is to be drawn by about four draft animals hitched to the device in any suitable manner, such as by means of a log chain and swivel secured in hole 12. When starting a ditch, a furrow is opened with a plow, the whole length of the ditch. The ditching machine is placed in this furrow and drawn therealong. When the end of the ditch is reached, the machine is turned, bottom edges up, and goes back over the same line to complete the ditch.

The machine needs no handles and is operated with one man standing on the forward end or point and another man sitting on the landside 5, and regulating the depth of the cut by either throwing his weight on the brace 6 or removing his weight and drawing upward on the brace 7 by hand.

What is claimed is:—

A ditching machine comprising an elongated landside having its forward end sharpened on a bevel, a diagonal brace having its rear end in advance of the rear end of the landside and being of the same width as the landside, a V-shaped scraper bar connecting the brace and landside, the forward pointed ends of said bar being widened and the upper and lower portion of the part which is connected to the brace being sharpened and extending respectively above and below the brace, the part of the bar connected to the landside being of the same width as the landside, and an approximately Z-shaped cross piece having one end extended forwardly and adjustably connected with the diagonal brace and having the other end extended rearwardly and adjustably connected with the landside.

In testimony that I claim the foregoing as my own, I have hereto affixed my signature in the presence of two witnesses.

SAM MILLER.

Witnesses:
R. E. MOORE,
W. H. HANNA.

Copies of this patent may be obtained for five cents each, by addressing the "Commissioner of Patents. Washington, D. C."